(12) United States Patent
Jung et al.

(10) Patent No.: US 11,524,477 B2
(45) Date of Patent: Dec. 13, 2022

(54) STORAGE CONTAINER AND REFRIGERATOR HAVING THE SAME

(71) Applicant: LG ELECTRONICS INC., Seoul (KR)

(72) Inventors: Hyungi Jung, Seoul (KR); Sangyong Lee, Seoul (KR); Seokjae Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 493 days.

(21) Appl. No.: 16/671,384

(22) Filed: Nov. 1, 2019

(65) Prior Publication Data

US 2020/0164609 A1 May 28, 2020

(30) Foreign Application Priority Data

Nov. 22, 2018 (KR) .......................... 10-2018-0145554

(51) Int. Cl.
*B32B 1/02* (2006.01)
*B65D 25/34* (2006.01)
(Continued)

(52) U.S. Cl.
CPC .............. *B32B 1/02* (2013.01); *B32B 15/017* (2013.01); *B32B 15/043* (2013.01); *B32B 15/20* (2013.01);
(Continued)

(58) Field of Classification Search
CPC ....... B32B 1/02; B32B 15/017; B32B 15/043; B32B 15/20; B32B 2255/06; B32B 2255/20; B32B 2255/26; B32B 2255/40; B65D 1/22; B65D 1/26; B65D 25/14; B65D 25/34
See application file for complete search history.

(56) References Cited

U.S. PATENT DOCUMENTS 6,307,193 B1 * 10/2001 Toole ...................... A47J 36/06
219/735
2003/0059600 A1 * 3/2003 Gazo ...................... C23C 28/04
427/323
(Continued)

FOREIGN PATENT DOCUMENTS

JP   H04-147838   5/1992
JP   H04-367441  12/1992
(Continued)

OTHER PUBLICATIONS

Korean Office Action dated Oct. 24, 2019 issued in KR Application No. 10-2018-0145554.
(Continued)

*Primary Examiner* — Walter Aughenbaugh
(74) *Attorney, Agent, or Firm* — KED & Associates, LLP

(57) ABSTRACT

A storage container includes a container body having a storage space defined therein; and a container cover coupled to one side of the container body to open and close the storage space, wherein the container body includes: an inner layer forming an inner face of the container body defining the inner space; and an outer layer bonded to the inner layer and forming an outer face of the container body. The inner layer is made of titanium first material, and the outer layer is made of aluminum second material.

12 Claims, 7 Drawing Sheets

(51) Int. Cl.
   *B32B 15/04* (2006.01)
   *B32B 15/20* (2006.01)
   *B65D 1/22* (2006.01)
   *B65D 25/14* (2006.01)
   *B32B 15/01* (2006.01)

(52) U.S. Cl.
   CPC ............... *B65D 1/22* (2013.01); *B65D 25/14* (2013.01); *B65D 25/34* (2013.01); *B32B 2255/06* (2013.01); *B32B 2255/20* (2013.01); *B32B 2255/26* (2013.01); *B32B 2439/40* (2013.01)

(56) References Cited

U.S. PATENT DOCUMENTS

| | | | | |
|---|---|---|---|---|
| 2006/0283844 | A1* | 12/2006 | Cheng | B23K 26/28 |
| | | | | 219/121.64 |
| 2010/0276432 | A1* | 11/2010 | Huo | A47J 36/02 |
| | | | | 220/573.2 |
| 2012/0074141 | A1* | 3/2012 | Abbas | A47J 36/06 |
| | | | | 220/573.1 |
| 2016/0054050 | A1 | 2/2016 | Seo et al. | |
| 2016/0273821 | A1 | 9/2016 | Schollin | |

FOREIGN PATENT DOCUMENTS

| | | |
|---|---|---|
| JP | H08-198338 | 8/1996 |
| JP | 2001-161533 | 6/2001 |
| JP | 2005-053173 | 3/2005 |
| JP | 3950904 | 8/2007 |
| JP | 4040986 | 1/2008 |
| KR | 10-1995-0030940 | 12/1995 |
| KR | 10-0738719 | 7/2007 |
| KR | 10-2010-0078484 | 7/2010 |
| KR | 10-0999937 | 12/2010 |
| KR | 10-1021417 | 3/2011 |
| KR | 20-2013-0004672 | 7/2013 |
| KR | 10-2016-0024231 | 3/2016 |

OTHER PUBLICATIONS

Korean Notice of Allowance dated Jun. 17, 2021 issued in Application No. 10-2018-0145554.
Korean Notice of Allowance dated Jun. 23, 2021 issued in Application No. 10-2020-0068275.
European Office Action dated Aug. 3, 2021 issued in Application No. 19209307.8.
European Search Report dated Mar. 26, 2020 issued in EP Application No. 19209307.8.

* cited by examiner

STORAGE CONTAINER AND REFRIGERATOR HAVING THE SAME

CROSS-REFERENCE TO RELATED APPLICATION(S)

This application claims a benefit under 35 U.S.C. § 119(a) of Korean Patent Application No. 10-2018-0145554, filed in Korea on Nov. 22, 2018, on the Korean Intellectual Property Office, the entire disclosure of which is incorporated herein by reference for all purposes.

BACKGROUND

1. Field

The present disclosure relates to a storage container and a refrigerator having the same.

2. Background

A refrigerator may be a home appliance that allows a user to store food at a low temperature in an internal storage chamber that is shielded by a door. The refrigerator may have a refrigerator body having a storage chamber formed therein, a door for opening and closing the storage chamber, and a refrigeration cycle apparatus for providing cold air to the storage chamber.

The refrigeration cycle apparatus may include a vapor compression type refrigeration cycle apparatus including a compressor for compressing a refrigerant, a condenser in which the refrigerant emits heat and is condensed, an expansion device in which the refrigerant is depressurized and expanded, and an evaporator in which the refrigerant absorbs latent heat from the surrounding and is evaporated. Further, the refrigerator may include at least one storage container accommodated in the storage chamber. The storage container may accommodate food therein. For example, the storage container may accommodate food such as kimchi.

Regarding the refrigerator having such a storage container, a following related art document 1 has been filed. 1. Publication Number: No. 10-2016-0024231 (Publication Date: Mar. 4, 2016). 2. Title: Storage container and refrigerator having the same.

The related art document 1 discloses a storage container having a container body having an inner space defined therein, and a container cover coupled to the container body. In this connection, the container body is made of stainless steel.

There is a problem that the storage container of the related art document 1 configured as described above is too heavy. Accordingly, there is a problem that a user using the storage container and the refrigerator including the same has inconvenience.

BRIEF DESCRIPTION OF THE DRAWINGS

Embodiments will be described in detail with reference to the following drawings in which like reference numerals refer to like elements, and wherein.

DETAILED DESCRIPTION

Figure 1:
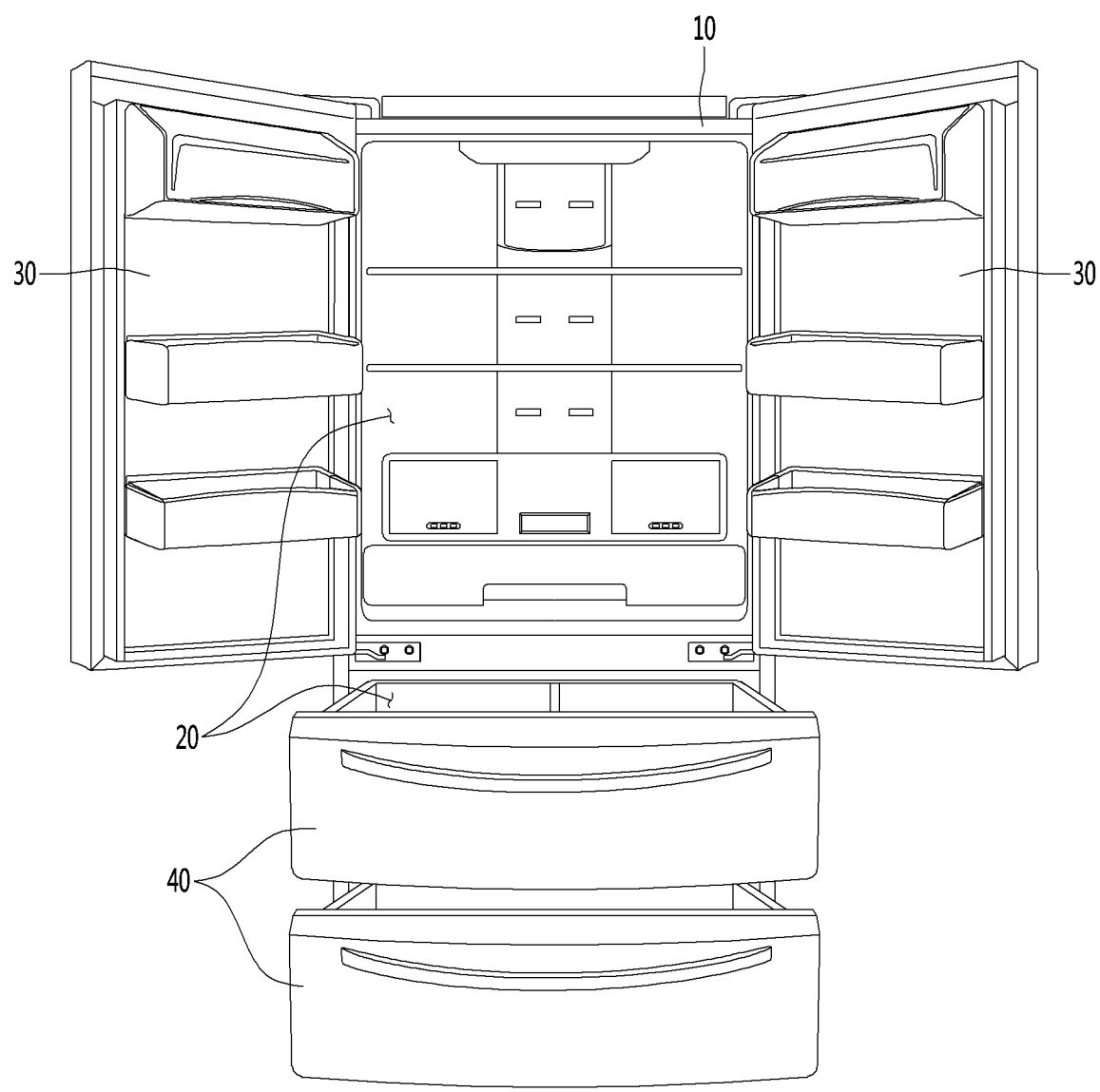
FIG. 1 illustrates a refrigerator according to an embodiment of the present disclosure.

As shown in FIG. 1, a refrigerator 1 according to an embodiment of the present disclosure may include a refrigerator body 10 in which a storage chamber 20 is formed. The storage chamber 20 may be formed in various shapes and numbers. For example, referring to FIG. 1, a plurality of storage chambers 20 may be arranged vertically.

Further, the refrigerator 1 may have a refrigerator door 30 for opening and closing the storage chamber 20. The refrigerator door 30 may be hinge-coupled to the refrigerator body 10 and may be pivotable. For example, referring to FIG. 1, a pair of refrigerator doors 30 may be provided to open and close one of the storage chambers 20.

Further, in the refrigerator 1, a drawer 40 arranged in the storage chamber 20 may be provided. The drawer 40 may slide in the refrigerator body 10. For example, referring to FIG. 1, the drawer 40 may be inserted into or withdrawn from the storage chamber 20.

Further, the refrigerator 1 may include a storage container 50 in which food is accommodated. The storage container 50 may be placed in the storage chamber 20. Further, the storage container 50 may be formed in various shapes and numbers depending on the application.

Figure 2:
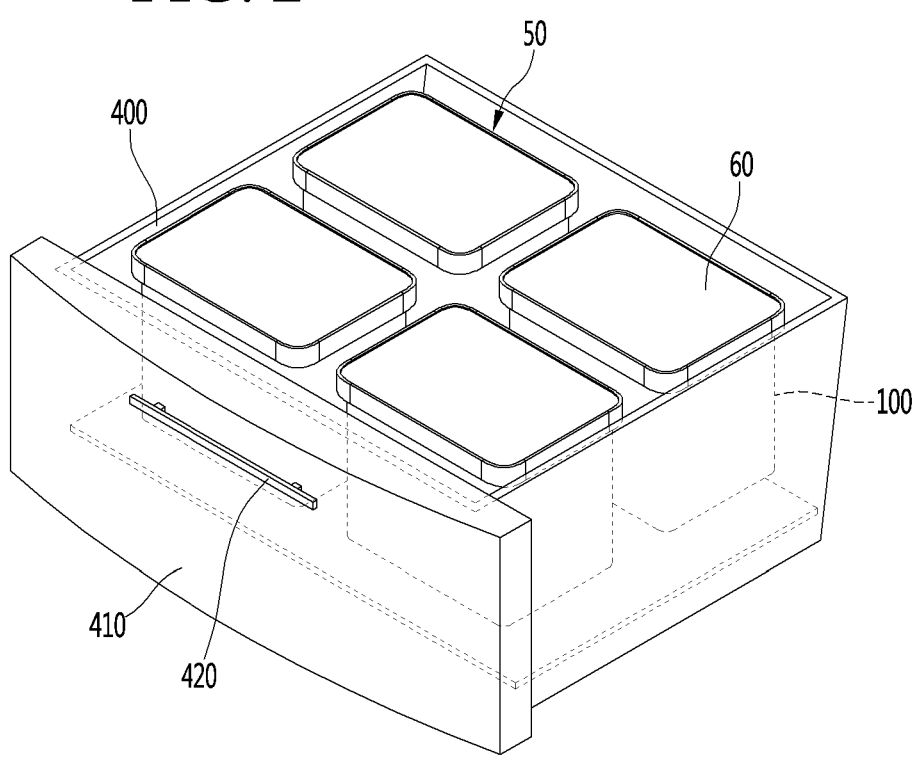
FIG. 2 illustrates a storage container disposed in the refrigerator according to an embodiment of the present disclosure.

Hereinafter, a storage container 50 disposed in the storage chamber 20 will be described. As shown in FIG. 2, the storage container 50 may be accommodated and arranged in the drawer 40. The drawer 40 may include a drawer body 400 that is retractable from the storage chamber 20 and a drawer front part or face 410 that is coupled to a front of the drawer body 400.

The drawer body 400 may have a space defined therein in which the storage container 50 is accommodated. In FIG. 2, four storage containers 50 are shown as accommodated, but this is an example and the present disclosure is not limited thereto. Further, the drawer body 400 may have a rail formed on an outer face thereof. The drawer body may be withdrawn from or inserted into the storage chamber 20 using the rail.

The drawer front face 410 may form an appearance of the drawer 40 when the drawer body 400 is accommodated in the storage chamber 20. In other words, the drawer front face 410 may form a portion of an appearance of the refrigerator 1. At the front of the drawer front face 410, a handle 420 that the user can grip may be formed.

Accordingly, the user may move the drawer 40 by holding the handle 420 and applying an external force thereto. In addition, the user may use a handle to withdraw the storage container 50 contained in the drawer 40 or the food contained in the storage container 50.

An arrangement of the storage container 50 and a shape of the drawer 400 may not be limited thereto. Further, the storage container 50 may be housed in the storage chamber 20. Further, depending on the user's needs, the storage container 50 may be placed independently of the refrigerator 10.

Figure 3:
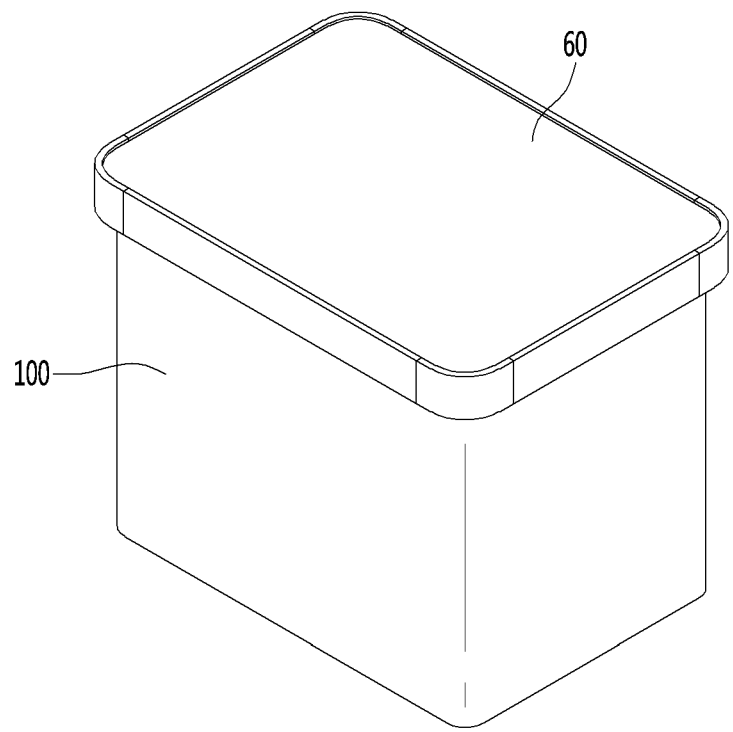
FIG. 3 illustrates a storage container according to an embodiment of the present disclosure.
Figure 4:
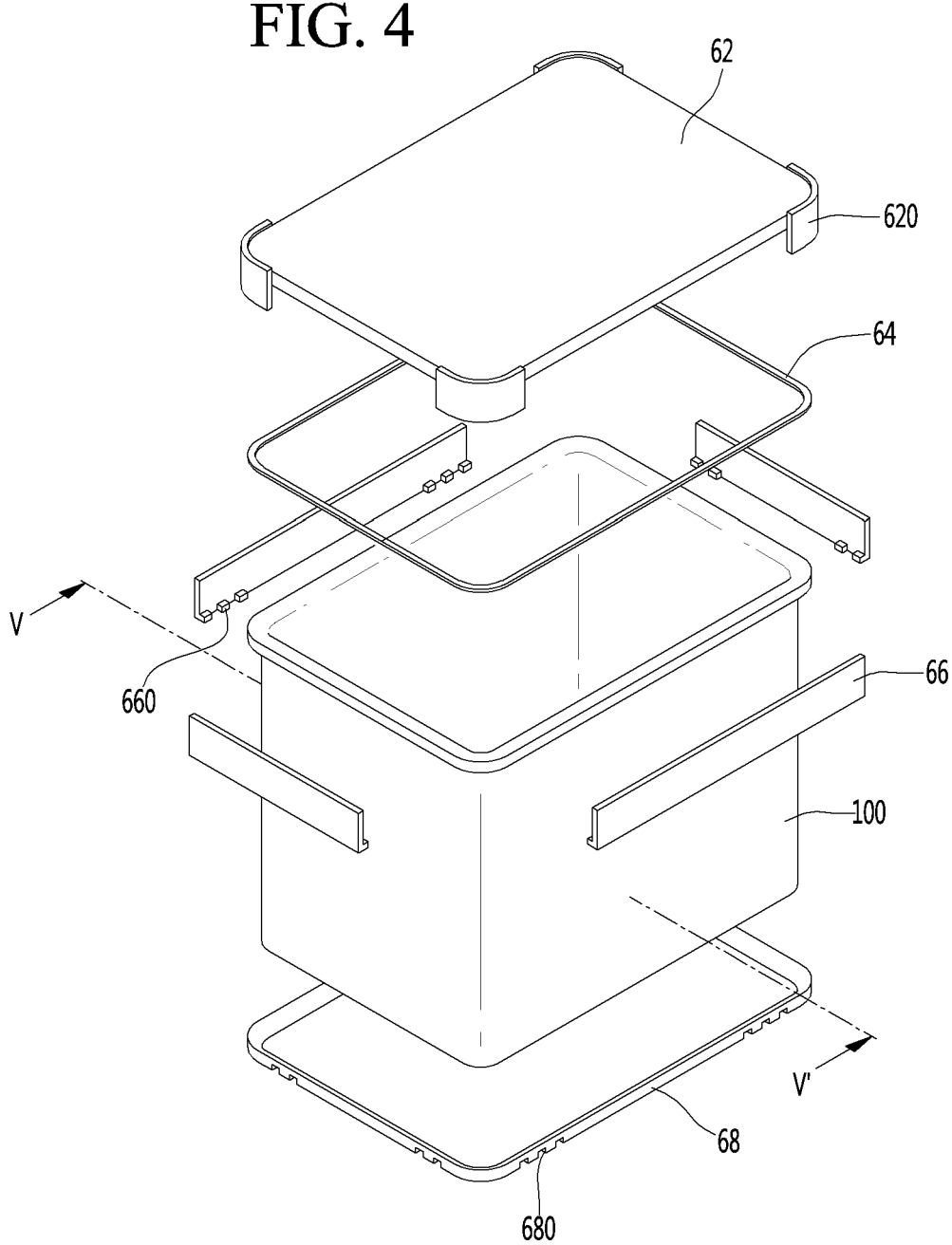
FIG. 4 is an exploded view showing the storage container according to an embodiment of the present disclosure.

As shown in FIG. 3 and FIG. 4, the storage container 50 may include a container body 100 and a container cover 60 coupled thereto. The container body 100 may be a component having a storage space defined therein in which food is accommodated. Further, the container cover 60 may be a part that is coupled to one side of the container body 100 to open and close the storage space.

The storage container 50 may seal food in the storage space. For example, kimchi may be accommodated in the storage container 50. In this case, the storage container 50 may be referred to as kimchi container, for example. Further, the refrigerator 1 in which the storage container 50 is placed may be called a kimchi refrigerator, for example.

The container body 100 may have a box shape with an open top face. The container cover 60 may be coupled to the open top of the container body 100. The container cover 60 may be coupled to a top edge forming the top face of the container body 100.

The container cover 60 may include a cover body 62, a seal 64, a manipulating portion (or fixing clip) 66 and a fixed frame 68. The cover body 62 may be formed in a rectangular shape corresponding to the top surface of the container body 100. In other words, the cover body 62 may be formed into a square plate having a predefined thickness.

The cover body 62 may have an extended cover 620 extending to the container body 100. The extended cover 620 may extend from the edge of the cover body 62. Four extended covers 620 may be formed at the corners of the cover body 62.

Further, the corners of the cover body 62 may be rounded for safety. Each of the extended covers 620 may be formed at each of four corners formed roundly. Accordingly, a space corresponding to one side of the cover body 62 may be formed between adjacent extended covers 620.

The fixed frame 68 may be coupled to the top of the container body 100. That is, the fixed frame 68 may have a rectangular frame shape corresponding to the top face shape of the container body 100. Accordingly, the fixed frame 68 may be provided between the container body 100 and the cover body 62.

Further, the fixing clip 66 may be a component for fixing the cover body 62 and the fixed frame 68 to each other. The fixing clip 66 may be pivotally coupled to the fixed frame 68. Accordingly, the fixed frame 68 may have a groove 680 into which the fixing clip 66 is coupled. A pivoting portion or joint 660 configured to be inserted into the groove 680 may be formed on the fixing clip 66.

The fixing clip 66 may be detachably coupled to the cover body 62. For example, the fixing clip 66 may have a hook formed on a side thereof opposite to the pivoting portion 680 and fitted with the cover body 62. However, this is only an example. The fixing clip 66 may be pivotally coupled to the cover body 62 and may be attached to or detached from the fixed frame 66.

Further, each fixing clip 66 may be provided between edges of the cover body 62. That is, four manipulating portions 66 may be arranged and correspond to four sides of the cover body. In other words, fixing clip 66 may be provided between adjacent extended covers 620.

Both ends of each fixing clip 66 may be in contact with adjacent extended covers 620 respectively. Further, a thickness of the fixing clip 66 may be equal to a thickness of the extended cover 620. Accordingly, when the fixing clips 66 are coupled to the cover body 62, a neat appearance may be formed as shown in FIG. 3.

The seal 64 may be installed between the container body 100 and the container cover 60 to form a seal therebetween. For example, the seal 64 may be made of a rubber material to prevent leakage of food contained in the storage space. Further, a smell of food may be prevented from leaking out of the storage container 40.

The shape and configuration of the container body 100 and container cover 60 are exemplary and not limited thereto. In particular, the container body 100 may have a predefined shape to form a storage space therein.

Figure 5:
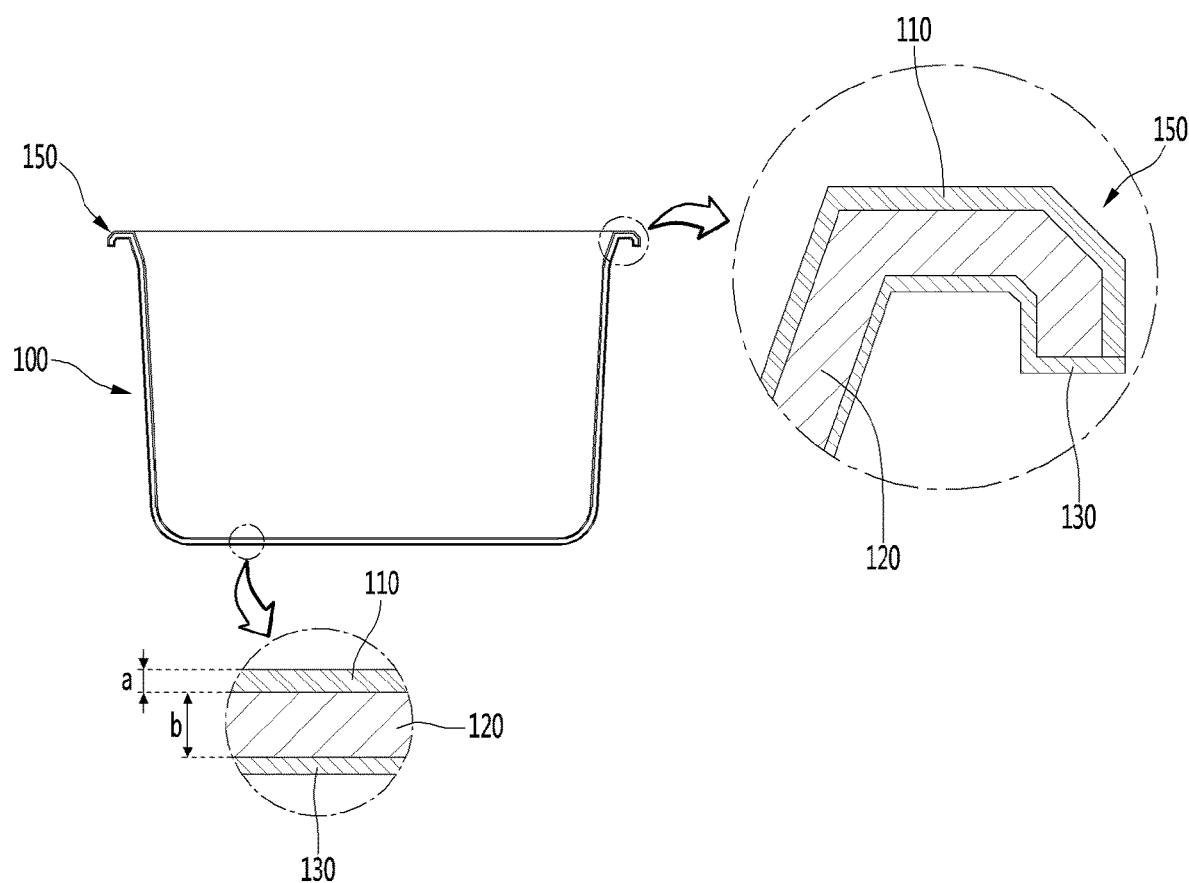
FIG. 5 illustrates a cross section taken along a line V-V' of FIG. 4.

As shown in FIG. 5, the container body 100 may have a plurality of layers. In other words, the container body 100 may be formed by combining a plurality of layers formed of different materials.

The container body 100 may include an inner layer 110 forming an inner face and an outer layer 120 forming an outer face. The inner layer 110 may form the inner face of the storage space, and thus may be defined as a part in contact with food. Further, the outer layer 120 may be a layer forming the outer face of the storage space, and may be defined as a part combined with the inner layer 110.

The inner layer 110 may be made of titanium. Titanium is a material used for artificial bones and teeth and is a human-friendly material. Further, titanium has excellent corrosion resistance. Accordingly, titanium is used for artificial heart, leg bones and joints.

In particular, a titanium oxide film may be formed on the surface of the titanium, and is very solid. Therefore, the corrosion into the inner layer may be prevented. Even if such a film is destroyed, it may be regenerated immediately. Further, titanium is known to have excellent corrosion resistance to chlorine ions.

Accordingly, the container made of the titanium may accommodate food safely, and may not corrode when contacting a food containing a lot of chlorine such as kimchi. As a result, the user may store therein food safely, thereby increasing the convenience of the user.

The outer layer 120 may be made of aluminum. Aluminum has a low density, is very lightweight, and is cost-competitive. Further, aluminum has good elongation and good workability. Accordingly, the storage container 50 according to an embodiment of the present disclosure may have the inner layer of titanium, and the outer layer of aluminum. As a result, food may be safely stored therein, and a lightweight and inexpensive storage container 50 can be obtained. These are examples, however, and any other suitable material may be used to form the inner layer and/or the outer layer.

Each of the inner layer 110 and the outer layer 120 may have a shape of a plate having a predefined thickness. In addition, the inner layer 110 and the outer layer 120 may be bonded to each other while facing each other, and may be machined into a predefined shape.

As shown in FIG. 5, the outer layer 120 may be thicker than the inner layer 110. A thickness b of the outer layer 120 may be three to four times a thickness a of the inner layer 110. For example, the thickness a of the inner layer 110 may be 0.2 mm, and the thickness b of the outer layer 120 may be 0.6 mm.

This thickness configuration may ensure rigidity while minimizing the thickness of the inner layer 110. Minimizing the thickness of the inner layer 110 may improve moldability together with the cost and weight savings.

The top edge of the container body may have a coupled portion (or lip) 150 made of a combination of the inner layer 110 and the outer layer 120. The lip 150 may be defined as a portion of the combination of the inner layer 110 and the outer layer 120 as bent downwardly.

Further, the lip 150 may be defined as a part coupled with the container cover 60. Referring to FIG. 5, the lip 150 may extend outward from the storage space formed in the container body 100. In other words, the lip 150 may define a top edge portion forming an open top of the container body 100.

In the lip 150, the combination of the inner layer 110 and the outer layer 120 may be exposed outwardly. When different materials are bonded to each other at the coupled portion, corrosion may occur at the lip 150. Further, as the bonded portion is exposed outwardly, the bonding therebetween may be weakened and they may be separated from each other by external shock. In other words, in the lip 150, the inner layer and outer layer may be separated from each other.

Further, the container body 100 may include a coating layer 130 that covers the outer layer 120 or the inner layer 110. In particular, the coating layer 130 may cover the lip 150. Accordingly, lip 150 as the combination of the inner layer 110 and the outer layer 120 may be prevented from being exposed to the outside.

Further, the coating layer 130 may cover the outer face of the outer layer 120. Accordingly, as illustrated in FIG. 5, the inner layer 110, the outer layer 120, and the coating layer 130 may be sequentially stacked. Such a coating layer 130 may be defined as a portion forming an appearance of the storage container 50.

The coating layer 130 may be formed of ceramic. The ceramic coating may have a variety of colors to provide a beautiful appearance. Further, as the coating is formed on an entire outer face of the container body 100, the coating may reinforce rigidity.

Figure 6:
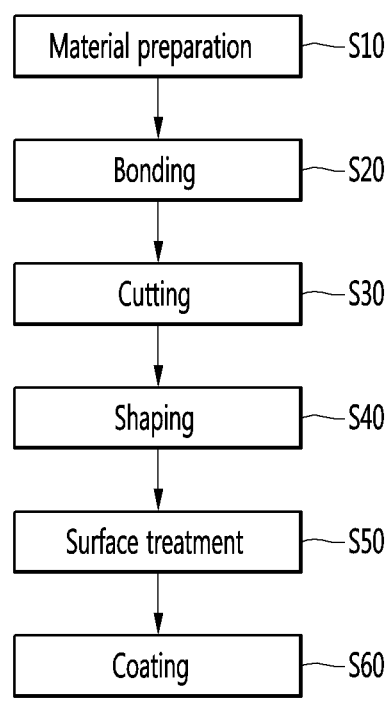
FIG. 6 illustrates a manufacturing process of the storage container according to an embodiment of the present disclosure.

As shown in FIG. 6, there is provided a step of preparing components forming the container body 100 (S10). The components may be titanium and aluminum plates forming the inner layer 110 and the outer layer 120 respectively. For example, titanium and aluminum roll sheets may be provided.

As described above, the thickness of the titanium plate may be smaller than the thickness of the aluminum plate. The titanium plate may be as thin as possible. Further, the aluminum plate may have the smallest thickness within a design limit for machining or rigidity.

The aluminum plate and the titanium plate may be bonded to each other (S20). A cladding process may be performed in which two plates are stacked and are rolled at a high temperature to form a laminate. Accordingly, the aluminum plate and the titanium plate may be pressed and joined to each other.

The bonded aluminum plate and titanium plate may be cut to a predefined size (S30) and, and machined into a predefined shape (S40). The bonded laminate may be machined into a container shape having an internal space. The titanium plate may define an inner face while the aluminum plate may define an outer face. In other words, the titanium inner layer 110 and the aluminum outer layer 120 may be formed.

An inner surface of the inner layer 110 and an outer surface of the outer layer 120 may be treated (S50). Foreign matter adhering to the surfaces of the inner layer 110 and the outer layer 120 may be removed therefrom, and an oxide film may be formed thereon. As the coating, a titanium oxide film may be formed on the inner layer 110 and an aluminum oxide film may be formed on the outer layer 120.

A coating layer 130 may then be formed (S60). Specifically, the ceramic may be spray-coated on the outer layer 120 and the lip 150. Such a ceramic coating may form a coating film on the outer face to secure an anti-scratch property and implement various colors.

The container body 100 formed as described above may be assembled with a separately manufactured container cover 60 to form a storage container 50. Then, the container may be provided as a separate product or may be accommodated in the refrigerator 1.

Figure 7:
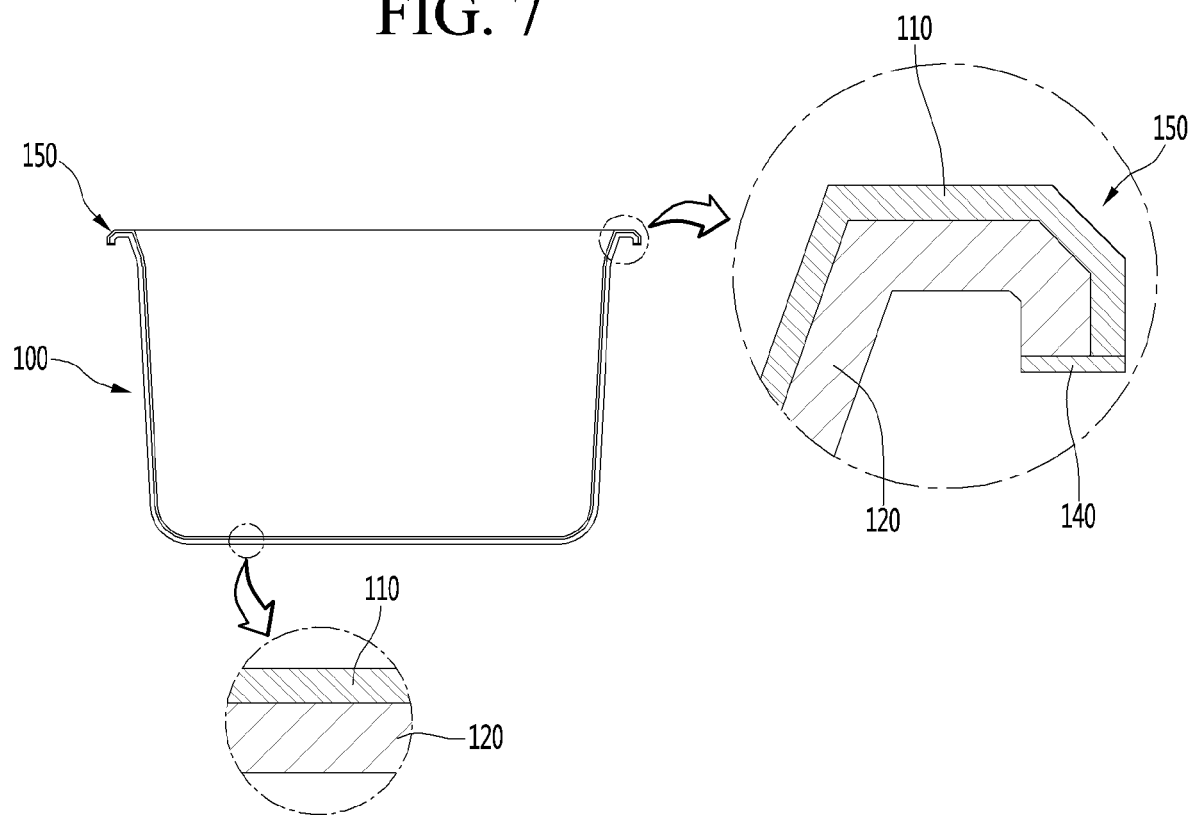
FIG. 7 illustrates another embodiment of a cross section taken along a line V-V' of FIG. 4.

As shown in FIG. 7, the coating layer 140 may be formed only on the lip 150. The coating layer 140 may cover the lip 150 as a combination of the inner layer 110 and the outer layer 120 defining a top edge of the container body 100. In other words, the coating layer 140 may cover the inner layer 110 and the outer layer 120.

The coating layer 140 may be free of a function of forming an appearance such as the coating layer 130 described above, and may be defined as a component for preventing corrosion of the coupled potion 150. In other words, the container body 100 may be formed while minimizing the coating layer 140.

The coating layer 140 may be made of engineering plastic. Engineering plastic is a workable and corrosion resistant material. Accordingly, the engineering plastic layer may be formed only on the lip 150. Further, the corrosion of the lip 150 may be effectively prevented. As such, as the outer layer 120 may be made of aluminum, various coating layers 130 and 140 may be formed thereon.

A storage container according to an embodiment of the present disclosure may have a container body having a storage space for accommodating food, and a container cover coupled to one side of the container body for opening and closing the storage space. The container body may include an inner layer forming an inner face of the storage space and an outer layer combined with the inner layer and forming an outer face of the storage space.

The inner layer may be made of titanium and the outer layer may be made of aluminum. Further, the outer layer may be thicker than the inner layer.

Further, the container body may include a coating layer covering the outer layer or the inner layer. The coating layer may be formed of ceramic. According to the storage container having the above configuration and the refrigerator having the same according to an embodiment of the present disclosure, following effects may be realized.

The storage container may have an inner layer made of titanium and an outer layer made of aluminum and thus may have a reduced weight and a reduced production cost. Accordingly, there is an advantage that the user's convenience can be increased.

In particular, when forming the inner layer of the container body using the titanium, there is an advantage that the container may have excellent corrosion resistance properties. Further, titanium is harmless to the human body and is a human-friendly material.

Further, when forming the outer layer of the container body using aluminum, there is an advantage that a variety of coating layers may be formed on the outer layer. In addition, as the coating layer is formed thereon, various appearances may be formed and a strength thereof may be supplemented.

While the present disclosure has been described with reference to preferred embodiments, those skilled in the art will appreciate that the present disclosure may be variously modified and changed without departing from the spirit and scope of the present disclosure set forth in the following claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A storage container comprising:
   a container body including an inner layer made of a first material and an outer layer bonded to the inner layer and made of a second material different from the first material;
   a fixed frame coupled to an upper portion of the container body;
   a plurality of fixing clips hingedly coupled to the fixed frame;
   a cover configured to cover the upper portion of the container body; and
   a seal provided between the container body and the cover,
   wherein the outer layer of the container body is coated with a coating layer made of a third material, and
   wherein the coating layer covers a joint between the inner layer and the outer layer at a lip formed at a top of the container body.

2. The storage container of claim 1, wherein a thickness of the outer layer is greater than a thickness of the inner layer, and wherein a density of the first material is greater than a density of the second material.

3. The storage container of claim 1, wherein the first material is titanium, the second material is aluminum, and the third material is ceramic or engineering plastic.

4. The storage container of claim 2, wherein the thickness of the outer layer is three to four times greater than the thickness of the inner layer.

5. The storage container of claim 3, wherein the inner layer is joined by cladding to the outer layer.

6. The storage container of claim 1, wherein the storage container is configured to store food including kimchi.

7. A refrigerator including:
   a refrigerator body;
   a storage chamber defined in the refrigerator body; and
   at least one storage container provided in the storage chamber and configured to accommodate food,
   wherein the at least one storage container includes:
      a container body including an inner layer made of a first material and an outer layer bonded to the inner layer and made of a second material different from the first material;
      a fixed frame coupled to an upper portion of the container body;
      a plurality of fixing clips hingedly coupled to the fixed frame;
      a cover configured to cover the upper portion of the container body; and
      a seal provided between the container body and the cover,
      wherein the outer layer of the container body is coated with a coating layer made from a third material different from the first and second materials, and
      wherein the coating layer covers a joint between the inner layer and the outer layer at a lip formed at a top of the container body.

8. The refrigerator according to claim 7,
wherein a thickness of the outer layer is greater than a thickness of the inner layer, and
wherein a density of the first material is greater than a density of the second material.

9. The refrigerator according to claim 8, wherein the first material is titanium, the second material is aluminum, and the third material is ceramic or engineering plastic.

10. The refrigerator according to claim 8, wherein the thickness of the outer layer is three to four times greater than the thickness of the inner layer.

11. The refrigerator of claim 9, wherein the inner layer is joined by cladding to the outer layer.

12. The refrigerator of claim 7, wherein the storage container is configured to store food including kimchi.

* * * * *